Oct. 22, 1940.  A. D. MACLACHLAN  2,219,047
HOSE AND COUPLING STRUCTURE
Filed Jan. 12, 1939
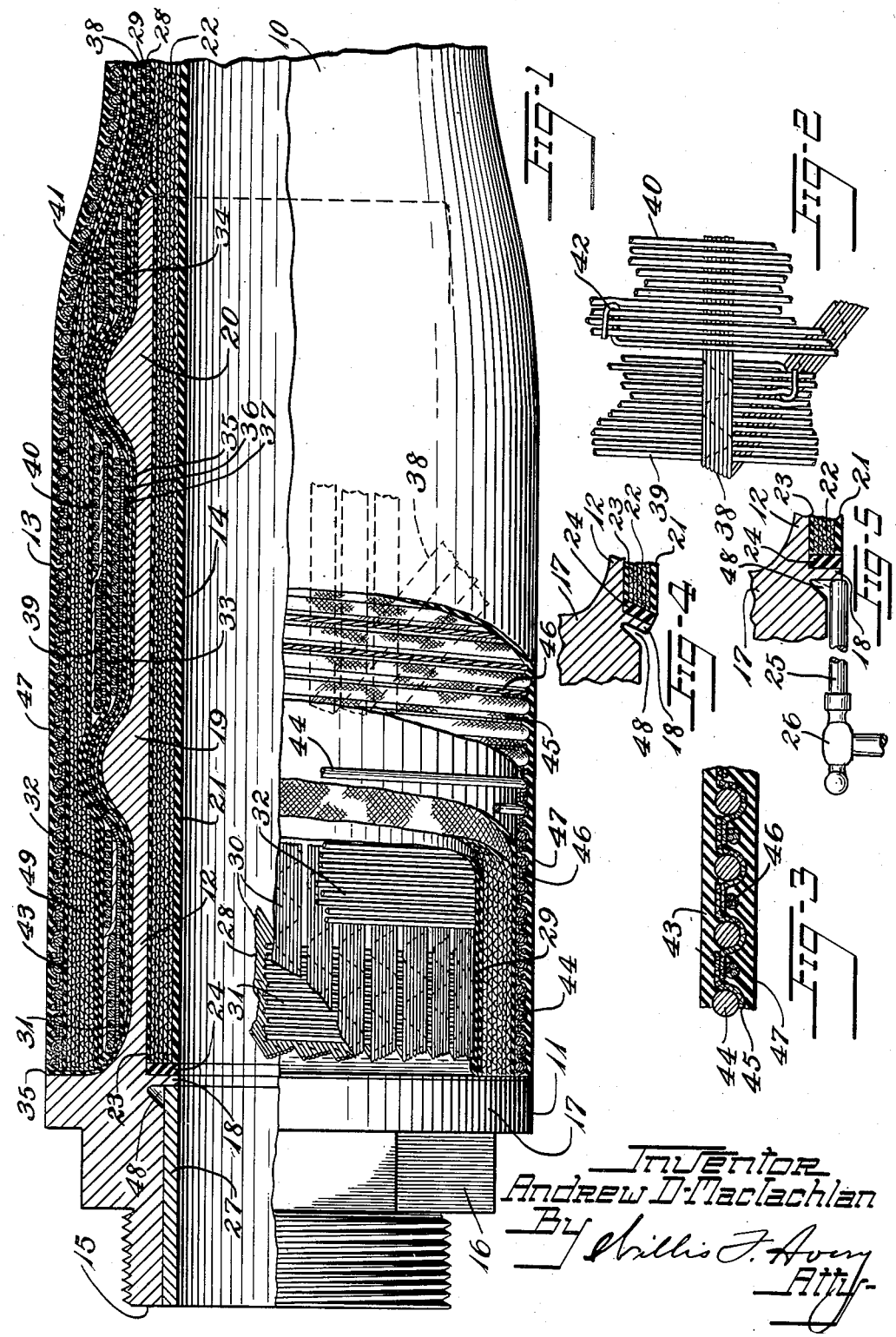
Inventor
Andrew D. MacLachlan
By Willis F. Avery
Atty.

Patented Oct. 22, 1940

2,219,047

UNITED STATES PATENT OFFICE 2,219,047

HOSE AND COUPLING STRUCTURE

Andrew D. Maclachlan, Akron, Ohio, assignor to The B. F. Goodrich Company, New York, N. Y., a corporation of New York Application January 12, 1939, Serial No. 250,565

5 Claims. (Cl. 285—80)

This invention relates to hose and coupling structures and the manufacture thereof and is especially useful where fluids under high pressures are conducted through flexible hose.

Hose adapted to conduct fluids under extremely high pressures has been developed for use in the well drilling industry where boring is done thousands of feet below the surface of the ground by rotary tools and fluid under high pressure is used to cool the drilling tools and to wash the debris from the well hole. In many other industries the use of fluids under extremely high pressure has been increasingly common.

Difficulty has been experienced in the provision of nipples or coupling members capable of being retained by the hose in fully leak-proof manner, and having the desired resistance to wear caused by abrasive material suspended in the fluid.

The principal objects of the present invention are to provide security of attachment of a coupling to the hose, to provide an improved hose and coupling structure which will not restrict the bore of the hose at the coupling, to provide adequate resistance of the coupling to abrasion, to provide effective mutual interlocking of the hose and the coupling, to provide effective sealing of the hose wall against percolation of fluid, to provide compactness of structure, to provide convenience of assembly, to provide durability, simplicity and neat appearance, and to dispense with the necessity for bulky clamping structures requiring bolts or clamps.

These and other objects will appear from the following description and the accompanying drawing.

Of the drawing:

Fig. 1 is an elevation, partly broken away and partly in section, showing a hose end structure embodying the invention in its preferred form.

Fig. 2 is a detail view illustrating the method of anchoring the reinforcing tapes about the windings of wire.

Fig. 3 is an enlarged detail view of the protective outer layers of the hose in section.

Fig. 4 is a detail sectional view of the inner layers of the hose and the adjacent coupling member illustrating the assembly thereof prior to the swaging of the coupling flange.

Fig. 5 is a similar view illustrating one method of performing the swaging operation, the flange being shown in its swaged position.

Referring to the drawing, the numeral 10 designates a flexible hose member and the numeral 11 a metallic coupling member built into the hose at the end thereof. The coupling member is formed with a long sleeve 12 which extends longitudinally of the hose between concentric portions 13, 14 of the hose wall which are separated in the region of the coupling by the sleeve and united therebeyond to form the flexible hose wall 10. A threaded spud 15 having a polygonal wrench seat 16 and a heavy radially extending flange 17 are formed integral with the sleeve 12 and are adapted to engage an adjoining connection. The sleeve 12 is of larger bore than the hose and the inner portion 14 of the hose extends therewithin without reducing the bore of the hose and preferably is vulcanized to the wall of the sleeve with its outer end impinging against an inwardly extending flange 18 integral with the sleeve 12. The outer face of the sleeve 12 is formed with one or more circumferential ribs 19, 20, preferably integral therewith, and adapted to interlock with elements of the hose wall as hereinafter described.

That part 14 of the hose extending within the sleeve comprises a lining 21 of rubber composition or other rubber like material, a reinforcing layer 22 of cotton or other woven material or cord, and a sealing layer 23 of rubber material or the like adapted to lie along the inner face of the sleeve 12 to provide a seal therewith, and vulcanized or otherwise adhesively secured thereto. A sealing ring 24 of rubber composition or the like, or an extension of the lining 21, extends across the ends of the plies 22 and is united to the lining 21 and to the layer 23. At the time the rubber hose material is vulcanized to the sleeve 12, the flange 18 is inclined to the sleeve and away from the rubber material as shown in Fig. 4 and the rubber and fabric materials are vulcanized to it in that position. After vulcanization the flange 18 is swaged or rolled or otherwise bent to a radial position as by use of a bar 25 and a hammer 26. This places the resilient rubber-like material adjacent the flange 18, so that the fluid pressure against the lining will be effective to press the hose material against the sleeve to maintain a strong seal. Another method of swaging the flange 18 into radial position is by forcing a bushing 27 of metal into the bore of the spud and against the flange. The bushing 27, which may be retained in place by a press-fit, is preferably of the same bore as the hose lining and the flange 18 so that when in place a smooth-bored assembly, free from friction-inducing shoulders is provided. By constructing the bushing 27 of abrasion resisting metal such as Stellite it not only serves the purpose of permanently supporting the flange 18 against the hose, but also provides an abrasion resisting lining for the spud.

The interior section of the hose being of expansible and pliable material is forced outwardly against the rigid sleeve 12 where the hose is in use and the greater the pressure of the fluid, the greater the sealing pressure against the sleeve.

Great strength against both longitudinal and circumferential stretch is provided in the hose by a plurality of layers of woven or braided wire tapes helically laid in crossed plies extending throughout the hose in a manner, for example, as is disclosed in my Patent No. 2,069,891. In the construction illustrated, the layers of wire tapes are located in the outer concentric part of the hose that extends over the sleeve 12, although some of the tapes may extend inside the sleeve if desired.

Interlocking of the layers of helically disposed tapes with the sleeve 12 in an improved manner secures the spud to the hose without separation in use.

The first layer 28 of helically disposed tapes 30 is built throughout the hose and preferably somewhat beyond the ends. At the sleeve 12 it is extended over the sleeve and intervening layers of material, being laid closely over the circumferential ribs 19, 20. Beyond the rib 19, a circumferential band 31 of binding wire is applied over the helical layer of tapes to bind them down tightly and the tapes 30 are bent back over this band to extend back as far as the circumferential rib 19. A second band 32 of binding wire is bound down upon the bent-back tapes at the ends adjacent the rib. A layer 33 of binding wire is applied over the first layer of helical tapes between ribs 19 and 20, and a layer 34 is applied to the tapes at the other side of the rib 20, whereupon the ribs lock the bound-down tapes in place.

A sealing layer 35 of rubber-like material extends under the tapes 28 along the sleeve, and other layers of fabric 36 and rubber 37 may be applied thereover. One or more layers of the rubber-like material and fabric may also be included in the material beneath the tapes 28.

A second layer 38 of helically applied tapes may be separated from the first layer 28 by an intermediate layer 29 of rubber-like material, the tapes of the successive layers being crossed. As the second layer of tapes reaches the circumferential rib 19 its ends are doubled back over a band 39 of binding wires and a second band 40 of binding wires is laid over the ends in the space between the band 39 and the rib 20. A band 41 of binding wires is wound adjacent the rib 20 near the end of the sleeve 12. Each binding band of wire is wrapped circumferentially and its ends are secured as at 42 in Fig. 2 or in any other suitable manner.

Plies of reinforcing fabric 43 are wound between the ribs 19, 20 and the flange 17 to fill the hose out to a smooth contour and to add additional strength thereto and a smooth layer 43 of rubber-like material is laid thereover to seal the underlying material, this layer being joined to the layer 35.

To provide an abrasion-resisting binding and cover over the entire hose, a layer 44 of wire is applied in spaced circumferential turns throughout the hose, a tape 45, having a width of about twice the pitch of the wire 44, is laid over the wire in the same direction in overlapping turns with the overlap occurring between the spaced coils. A binding cord or wire 46 is then wound over the overlapping tape margins and between the wires 44, and a protective layer 47 of rubber is applied thereover.

The flange 17 is preferably flush with the layer 47 to provide a smooth outer face free from objectionable projections. The inner and outer parts of the hose between which the sleeve 12 is anchored, are united at the end of the sleeve to provide a continuous flexible hose wall of less thickness than the thickness of the assembly at the sleeve, the outer surface being gradually tapered between the sleeved portion and the unsleeved portion.

As the wire cross windings are of smaller diameter than the ribs 19, 20, and the metallic tapes of the layers 28, 38 are snubbed thereabout beyond the ribs, and pull on the tapes in a direction lengthwise of the hose draws them tighter against the cross windings and provides a structure in which the sleeve member is positively anchored to the tape reinforcement.

The flange 18 is made of greater radial depth than the bushing 27 so as to position the area of attachment of the flange to the sleeve radially beyond the outer surface of the bushing at any point thereabout, thus making for greater strength of the flange. A groove 48 separates the flange 18 from the bushing supporting surface of the spud 15, and facilitates the swaging movement without undesirably stressing the flange.

The swaging of the flange 18 deflects it toward the end of the inner hose member, thereby placing the end of the hose member under compression by axial loading thereof. While the anchoring of the wire tapes of the outer hose member substantially prevents any axial movement of the sleeve with relation to the hose, the axial loading of the hose at the line of junction of metal and rubber by swaging of the flange 18 cooperates therewith to counteract any lost motion of the anchorage and compensates for any possible stretch of the hose to prevent entrance of fluid between metal and rubber. By vulcanizing the hose prior to the swaging step the resilient materials of the hose will maintain the axial pressure of the swaged flange.

While a hose structure having two layers of helically disposed tapes has been illustrated and described, hose having additional layers of tapes may be anchored in the same manner.

Variations may be made in the hose structure without departing from the spirit of the invention as it is defined by the following claims:

I claim:

1. A hose and coupling structure comprising a sleeve having a circumferentially extending rib on its outer surface, a hose wall extending thereover, said hose wall comprising a strip reinforcement extending along said sleeve and over said rib, a circumferential binding element over said reinforcement behind said rib, said reinforcement being reversed upon itself and over said binding element, and a second circumferential binding element upon the reversed portion of the reinforcement for securing the hose to said sleeve.

2. A hose and coupling structure comprising a sleeve having a circumferentially extending rib on its outer surface, a hose wall extending thereover, said hose wall comprising a strip reinforcement extending along said sleeve and over said rib, a circumferential binding element over said reinforcement behind said rib and within the outermost radial extent of the latter, said reinforcement being reversed on itself over said binding element, and a second circumferential binding element upon the reversed portion of the reinforcement also within the outermost radial extent of said rib for securing the hose to said sleeve.

3. A hose and coupling structure comprising a sleeve having a circumferentially extending rib on its outer surface, and a hose wall extending thereover, said hose wall comprising a reinforcement therein of metallic tape extending helically along said sleeve and over said rib, a circumferential binding element over said reinforcement behind said rib and within the outermost radial extent of the latter, said reinforcement being reversed on itself over said binding element, and a second circumferential binding element upon the reversed portion of the reinforcement for securing the hose to said sleeve.

4. A hose and coupling structure comprising a tubular hose body having its wall circumferentially divided at an end thereof to provide concentric inner and outer wall portions, and a metallic coupling having a sleeve integral therewith and circumferentially extending ribs on said sleeve, said sleeve extending between the concentric wall portions, the inner of said wall portions being sealed to the inner side of the sleeve and the outer wall portion comprising layers of helically laid metallic reinforcing elements disposed over and behind said ribs on the sleeve, circumferential binding elements over said reinforcing elements behind said ribs and within the outermost radial extent of the latter, said reinforcing elements being reversed on themselves over said binding elements, and other circumferential binding elements upon the reversed portions of the reinforcing elements behind said ribs and within the outermost radial extent of the latter for securing the hose to said sleeve.

5. A unitary hose and coupling structure comprising a sleeve having abutments on its outer surface and a stiffly deformable flange at its inner surface, a hose wall including rubber-like material and reinforcing layers of metallic mesh tapes disposed in crossed helices, a portion of the hose wall including said tapes being disposed over and behind said abutments upon the outer surface of said sleeve and another portion of said hose wall being disposed at the inner surface of the sleeve with the end of the hose wall abutting said flange, said flange being deformed to provide sealing pressure against the end of the vulcanized hose wall, and strip means within the outermost radial extent of said abutment for binding the reinforcing tapes upon the underlying structure at axially opposite sides of said abutments to anchor the hose wall against axial separation from the sleeve, the end portions of the reinforcing tapes being bent back over said binding means, and additional circumferential strip means binding the reversed end of the reinforcing tapes for securing the hose structure to said sleeve.

ANDREW D. MACLACHLAN.